(12) United States Patent
Mori et al.

(10) Patent No.: US 6,357,920 B1
(45) Date of Patent: Mar. 19, 2002

(54) SINTERED OIL RETAINING BEARING AND SPINDLE MOTOR FOR INFORMATION EQUIPMENT

(75) Inventors: Natsuhiko Mori; Kazuo Okamura, both of Mie-ken; Makoto Shiranami, Aichi-ken, all of (JP)

(73) Assignee: NTN Corporation, Osaku-fu (JP)

( * ) Notice: Subject to any disclaimer, the term of this patent is extended or adjusted under 35 U.S.C. 154(b) by 0 days.

(21) Appl. No.: 09/504,718

(22) Filed: Feb. 16, 2000

(30) Foreign Application Priority Data

Feb. 24, 1999 (JP) ............................. 11-046642

(51) Int. Cl.$^7$ ............................................. F16C 32/06
(52) U.S. Cl. .................... 384/279; 384/114; 384/902
(58) Field of Search ................................. 384/100, 107, 384/114, 279, 902

(56) References Cited

U.S. PATENT DOCUMENTS

| | | | | |
|---|---|---|---|---|
| 5,628,569 A | | 5/1997 | Hayakawa et al. | 384/278 |
| 5,762,423 A | * | 6/1998 | Mori et al. | 384/279 |
| 5,762,895 A | * | 6/1998 | Schwetz et al. | 423/345 |
| 5,810,481 A | * | 9/1998 | Nii et al. | 384/279 |
| 5,932,946 A | * | 8/1999 | Miyasaka et al. | 310/90.5 |
| 5,941,646 A | * | 8/1999 | Mori et al. | 384/279 |

FOREIGN PATENT DOCUMENTS

DE  198 09 770 A1  9/1998

OTHER PUBLICATIONS

Abstract of Japanese Patent Publication No. 05071539; dated Mar. 23, 1993.
Abstract of Japanese Patent Publication No. 11264031; dated Sep. 28, 1999.
Abstract of Japanese Patent Publication No. 11037156; dated Feb. 9, 1999.
Abstract of Japanese Patent Publication No. 11236604; dated Aug. 31, 1999.
Abstract of Japanese Patent Publication No. 62080310; dated Apr. 13, 1987.
Abstract of Japanese Patent Publication No. 06207619; dated Jul. 26, 1994.
Abstract of Japanese Patent Publication No. 01242821; dated Sep. 27, 1989.
Abstract of Japanese Patent Publication No. 11062969; dated Mar. 5, 1999.
Abstract of Japanese Patent Publication No. 02008302; dated Jan. 11, 1990.

* cited by examiner

*Primary Examiner*—Thomas R. Hannon
(74) *Attorney, Agent, or Firm*—Arent Fox Kintner Plotkin & Kahn, PLLC

(57) ABSTRACT

There is provided a sintered oil retaining bearing that secures the stability of an oil film and achieves high running accuracy through management to exclude a variation in the size of surface openings in the bearing surface, particularly the presence of large holes, while making use of such advantages as the mass productivity, low noise and low cost features of sintered oil retaining bearings.

In a sintered oil retaining bearing 11 having a bearing body 19 that is composed of a porous body formed of a sintered metal, that is formed with a bearing surface 18 opposed to the outer peripheral surface of a rotary shaft 1 through a bearing clearance and that is impregnated with lubricating oil or lubricating grease, it is arranged that surface openings in said bearing surface 18 are substantially uniform in size and that when the area of a single such surface opening is converted into the area of a circle, the diameter of such circle does not exceed 0.05 mm.

9 Claims, 3 Drawing Sheets

SINTERED OIL RETAINING BEARING AND SPINDLE MOTOR FOR INFORMATION EQUIPMENT

BACKGROUND OF THE INVENTION

The present invention relates to a sintered oil retaining bearing suitable for use as a bearing that is built in small-sized spindle motors for information equipment, which is required to have high running accuracy, including, for example, optical disk devices, such as CD-ROMs and DVD-ROMs/RAMs, magnetic disk devices, such as HDDs, and polygon scanners for laser beam printers, and it also relates to a method of producing the same and a spindle motor for information equipment.

Small-sized spindle motors for information equipment, which is required to have high running accuracy, including, for example, optical disk devices, such as CD-ROMs and DVD-ROMs/RAMs, magnetic disk devices, such as HDDs, and polygon scanners for laser beam printers, are required to have high speed and high running accuracy as their performance is enhanced.

For example, in the aspect of high speed, in the case of CD-ROMs, their rotary speed was thousands of rpm when first put to practical use but recently there has been a demand for a higher rotary speed of above 10,000 rpm. Further, in the case of polygon scanner motors, the required rpm was about 10,000 except for equipment that used hydrodynamic air bearings, whereas recently there has been an increasing demand for a higher rotary speed of about 30,000 rpm.

In such information equipment, the rotary shaft on which a rotary element, such as a disk, is mounted is supported usually by ball bearings and recently a support construction using sintered oil retaining bearings has been employed.

In this connection, in the aforesaid small-sized spindle motors, high running accuracy and reduced noise are simultaneously required in addition to high speed; therefore, it has become difficult for the heretofore employed ball bearings and sintered oil retaining bearings to satisfy the aforesaid demanded performance.

For example, with ball bearings used, the following drawbacks occur.

Ball bearings are accompanied by a peculiar race sound (the sound produced by balls rolling on the rolling bearing rings) and noise caused by the self-vibration of the cage, and if they are operated at high speed, the noise level rises, so that their application to polygon scanner motors and the like is not suitable.

Further, the ball bearing has many components, including an outer ring, an inner ring, balls, a cage, seals and grease; thus, many factors that affect running accuracy, including the mechanical accuracy of the respective components, the accuracy with which the ball bearing is assembled to a motor, and the pre-pressurized state, are complicatedly mixed up. Therefore, the management for accuracy is difficult and it has been hard to attain the running accuracy including NRRO required of magnetic disk motors.

On the other hand, the sintered oil retaining bearing is superior to the aforesaid ball bearing in that its noise and cost are low, but since it is porous, it has surface openings in the bearing surface, allowing the oil in the bearing clearance to escape into the bearing body when an oil film pressure develops, because of which construction if there is a variation in the size of the surface openings, the amount of the escaping oil differs from place to place, thus adversely affecting the rotary performance. Therefore, it has been difficult to apply conventional sintered oil retaining bearings to the equipment of which high running accuracy and the like are required.

SUMMARY OF THE INVENTION

An object of the invention is to provide a sintered oil retaining bearing that secures the stability of an oil film in the bearing clearance and achieves high running accuracy through management to exclude a variation in the size of surface openings in the bearing surface, particularly the presence of large holes, while making use of such advantages as the mass productivity, low noise and low cost features of sintered oil retaining bearings.

A sintered oil retaining bearing according to the invention has a bearing body that is composed of a porous body formed of a sintered metal and that is formed with a bearing surface opposed, through a bearing clearance, to the outer peripheral surface of a shaft to be supported, said bearing body being impregnated with lubricating oil or lubricating grease, said sintered oil retaining bearing being characterized in that the surface openings in said bearing surface are substantially uniform in size, and in that when the area of a single such surface opening is converted into the area of a circle, the diameter of such circle does not exceed 0.05 mm.

The area of a single surface opening in the bearing surface of a general sintered oil retaining bearing corresponds mostly to a diameter of 0.01–0.02 mm when it is converted into the area of a circle, but there are large holes whose area corresponds to a circle diameter exceeding 0.05 mm or 1 mm. If there are large holes whose area corresponds to a circle diameter exceeding 0.05 mm, the amount of the oil escaping into the bearing body is locally increased in the region where said large holes exist, causing trouble to the continuity of oil films and the stability of oil film pressure.

Therefore, if it is ensured that the respective areas of said surface openings are substantially uniform and that when the area of such surface opening is converted into the area of a circle, the diameter of the circle does not exceed 0.05 mm, it is possible to prevent the local escaping of oil, improving the continuity of an oil film in the bearing clearance and the stability of oil film pressure, thus providing the effect of reducing the shaft deflection of, e.g., optical disk motors.

Further, if the proportion of the surface area occupied by the surface openings to the total bearing surface is 10% or less, the oil film pressure in the entire bearing clearance is improved and the bearing rigidity is increased, so that the bearing can be applied even if imbalance loading occurs due to the mounting of a disk as in optical disk devices or even if a high centrifugal force acts due to high speed driving.

In a sintered oil retaining bearing according to the invention, if the bearing body is formed with a plurality of bearing surfaces located in axially spaced places, and if the inner diameter of the region between bearing surfaces is set greater than the inner diameter of the bearing surfaces, the axial misalignment between bearing surfaces can be minimized when a plurality of bearings are separately incorporated into a spindle motor.

That is, a plurality of bearing surfaces are provided in a single bearing and since they are simultaneously formed, the axial misalignment between bearing surfaces can be minimized. Further, since the inner diameter of the region between bearing surfaces is set greater than the inner diameter of the bearing surfaces, there is no possibility of the torque increasing as compared with the case where a plurality of bearings are separately incorporated.

Further, if axially inclined hydrodynamic grooves are formed in the bearing surfaces of the bearing body, then such hydrodynamic grooves form satisfactory oil films in bearing clearances, and the resulting oil film pressure supports an object shaft in a contactless manner, greatly improving the running accuracy of the shaft.

In addition, a sintered oil retaining bearing according to the invention is incorporated into a spindle motor for information equipment that comprises a rotary shaft on which the rotary element of information equipment is mounted, a rotor mounted on said rotary shaft or a rotary member rotatable with said rotary shaft, and a stator mounted on a stationary member, and said bearing can be used as a bearing for rotatably supporting said rotary shaft.

Further, as a production method that ensures that the surface openings in the bearing surfaces are substantially uniform in area and that excludes large openings whose area corresponds to a circle diameter exceeding 0.05 mm when it is converted to the area of such circle, the present invention is characterized in that in compacting a metal powder into a cylindrical form by using a forming die and a forming core rod, a relative motion is imparted between the forming core rod and the metal powder after the latter has been charged into the forming die. Thereby, the bridge phenomenon that occurs when a metal powder is charged into a forming die can be excluded and the manufacturing process does not lead to a cost increase.

DESCRIPTION OF PREFERRED EMBODIMENTS

Figure 1:
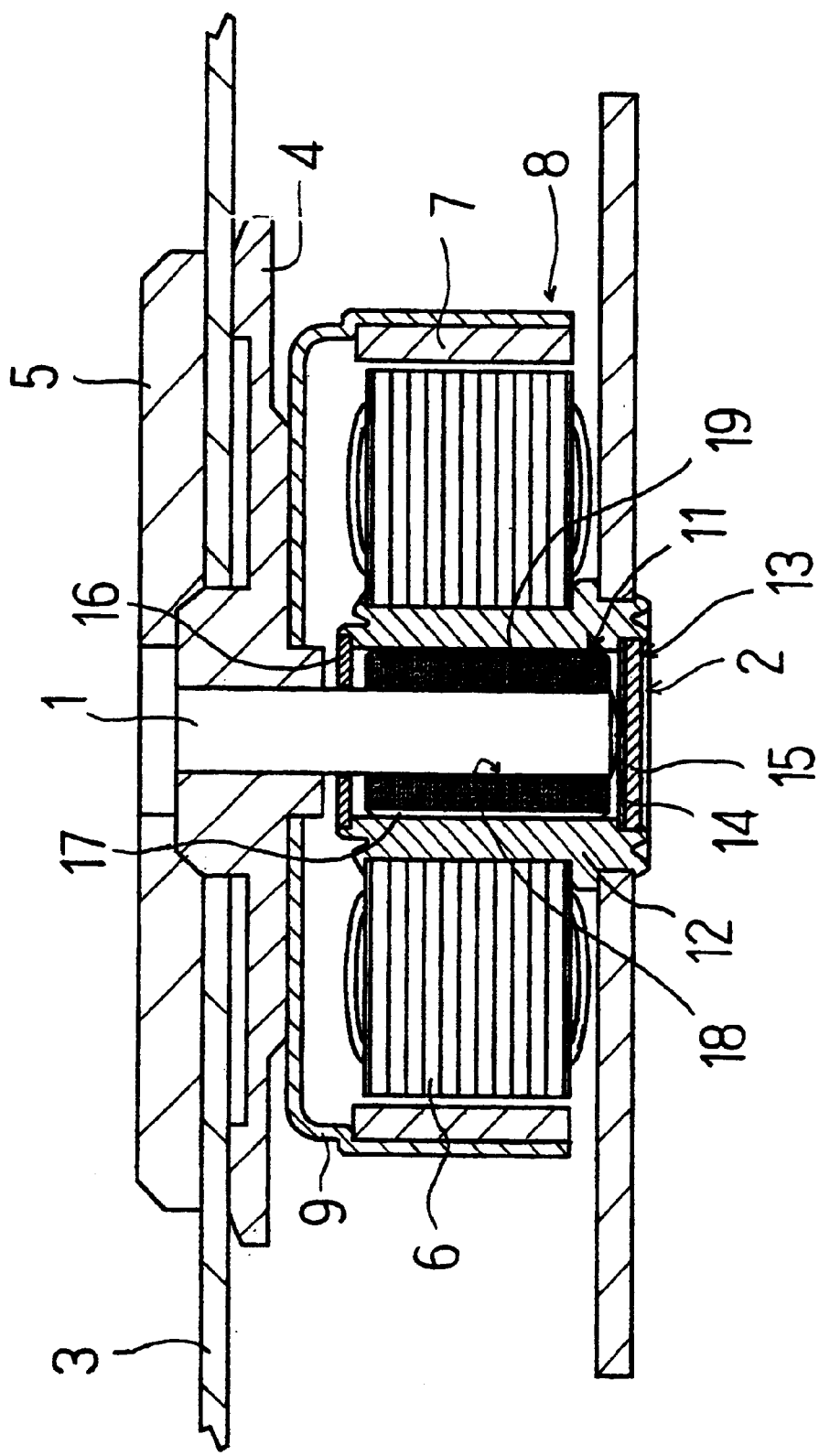
FIG. 1 shows an embodiment of the present invention, being a sectional view showing a spindle motor to be incorporated into a DVC-ROM device, which is a kind of information equipment.

Embodiments of the invention will now be described. FIG. 1 shows a sintered oil retaining bearing according to an embodiment of the invention, showing a spindle motor to be incorporated into a DVD-ROM device, which is a kind of information equipment.

This spindle motor comprises a bearing unit 2 supporting a vertically installed rotary shaft 1, a turntable 4 and a clamper 5 that are attached to the upper end of the rotary shaft 1 and fixedly support an optical disk 3 such as a DVD-ROM, and a motor section 8 having a stator 6 and a rotor magnet 7 that are opposed to each other through a radial gap.

In the spindle motor having the construction described above, an electric current is passed through the stator 6 to produce an exciting force between the stator 6 and the rotor magnet 7 to rotate the latter, whereupon a rotor case 9 integral with the rotor magnet 7, the turntable 4, the optical disk 3, the damper 5 and the rotary shaft 1 are rotated.

The bearing unit 2 has its main portion composed of a sintered oil retaining bearing 11 and a housing 12 having said sintered oil retaining bearing 11 fixedly fitted therein. The housing 12 is substantially cylindrical, with a thrust bearing 13 mounted on the bottom thereof. The thrust bearing 13 closes the opening in the bottom of the housing 12.

The thrust bearing 13 is constructed, for example, by laminating a disk-shaped resin thrust washer 14 and a back plate 15 supporting the latter. The rotary shaft 1 is supported in the thrust direction by contacting its lower end with the thrust washer 14 of the thrust bearing 13.

Further, the upper end opening in the housing 12 has a seal washer 16 mounted thereon for preventing oil leakage. The clearance between the seal washer 16 and the rotary shaft 1 is set preferably to 0.1 mm or less. Further, the clearances between the seal washer 16 and the thrust washer 14, respectively, and the end surface of the sintered oil retaining bearing are set preferably to 1 mm or less, more preferably to 0.5 mm or less.

In addition, if an axial ventilation groove 17 is formed in the outer peripheral surface of the sintered oil retaining bearing 11, the rotor can be smoothly assembled since no air will be shut in when the rotary shaft 1 is inserted in the sintered oil retaining bearing 11.

Figure 2:
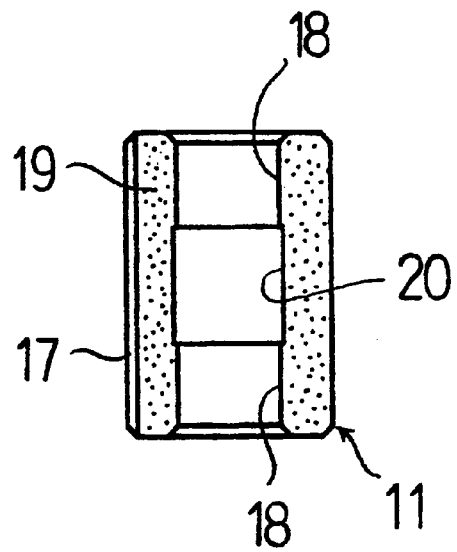
FIG. 2 is a sectional view of a sintered oil retaining bearing according to the invention wherein a plurality of bearing surfaces are formed on axially spaced places on the bearing body and the inner diameter of the region between the bearing surfaces is larger than the inner diameter of the bearing surfaces.

The sintered oil retaining bearing 11, as shown in FIG. 2, is made by impregnating a cylindrical bearing body 19 composed of a porous body formed of a sintered metal with lubricating oil or lubricating grease (preferably containing a low concentration of thickening agent), said bearing body having a bearing surface 18 opposed to the outer peripheral surface of the rotary shaft 1 (see FIG. 1) through a bearing clearance (not shown). The bearing body 19 composed of a porous body formed of a sintered metal is formed of a sintered metal that is composed mainly of, for example, copper or iron, or both, preferably containing 20–95% copper.

In this sintered oil retaining bearing 11, since the bearing body 19 is a porous body formed of a sintered metal and impregnated with lubricating oil or lubricating grease, the lubricant (the base oil of the lubricating oil or lubricating grease) in the bearing body 19 seeps out of the surface of the bearing body 19 owing to the pressure development attending the rotation of the rotary shaft 1 and thermal expansion of the oil caused by a temperature rise, and forms a load-supporting oil film to support the rotary shaft 1 in a contactless manner by wedge action in the bearing clearance.

In addition, if the bearing clearances and the regions around the bearing can be filled with a lubricating agent before the rotary shaft 1 is inserted in the bearing body 19 during the assembling of the rotor, in addition to the lubricating agent seeping out of the bearing body 19, then oiling may be effected to the extent in which the first-mentioned lubricating agent seeping out of the bearing unit 2 does not contaminate the surroundings; in that case, it becomes easier for oil films to form.

Then, if an oil film pressure develops in the bearing clearances owing to said wedge action, the presence of the surfaces openings (by which is meant those portions of the pores in the porous structure which are exposed to the outer surface) in the bearing surface 18 of the bearing body 19 allows the lubricating agent to flow back into the bearing body 19; however, if the surface openings in the bearing surface 18 are not uniform in size and larger holes locally exist, the amount of the escaping oil increases in these regions.

For example, in the case of a DVD-ROM, the mounting of an optical disk 3 (see FIG. 1) produces an imbalance load, causing the rotor to whirl in the imbalance direction by centrifugal force; however, if the surface openings are not uniform in size, the oil film pressure changes during the time the rotary shaft 1 completes one revolution, resulting in the lowering of the running accuracy. Further, if there are larger holes, the oil film pressure locally decreases, so that in some cases it becomes impossible to support the rotary shaft 1, resulting in contact between the rotary shaft 1 and the bearing body 19. Such contact between the rotary shaft 1 and the bearing body 19 not only lowers the running accuracy but also causes a torque variation and a torque rise, thus lowering the durability.

In contrast thereto, the present invention excludes those surface openings in the bearing surface 18 of the bearing body 19 whose area corresponds to the diameter, 0.05 mm and more, of a circle when it is converted to the area of such circle; therefore, there is no possibility of a local pressure decrease, making it possible to ensure the continuity of oil films and the stability of oil film pressure and prevent the lowering of running accuracy due to the nonuniformity of the size of the surface openings.

Further, in the invention, the surface opening percentage (which means the proportion of the total area of the surface openings to the area of the bearing surface) of the bearing surface 18 is set to 10% or less. As the number of revolutions increases as in recent optical disk devices, the centrifugal load due to imbalance loading greatly increases since centrifugal force is proportional to the second power of the number of revolutions. To support this centrifugal load, the load supporting force of oil films has to be increased by reducing the surface opening percentage, and it is preferable that the surface opening percentage, which is usually 20–30%, be reduced to 10% or less.

Referring to FIG. 2, one bearing body 19 shown therein is provided on its inner peripheral surface with a plurality of axially spaced hydrodynamic bearing surfaces 18 (two in this embodiment), the inner diameter of a region 20 between the bearing surfaces being set larger than that of the bearing surfaces 18, the purpose of which is to solve the problem that it is difficult to attain coaxialness when a plurality of bearings are separately arranged in the housing 12 and to avoid the drawbacks including reduced accuracy.

That is, if a plurality of bearings are received in the housing 12, then a problem arises concerning accuracy including coaxialness and cylindricality of the bearings, and in the case of poor accuracy, the rotary shaft 1 would come into linear contact with the bearings or in the worst case, the rotary shaft 1 could not pass through the two bearings. In contrast thereto, if one bearing body 19 is formed with a plurality of bearing surfaces 18 (two in the figure), as in this embodiment, and if the inner diameter of the region 20 between the bearing surfaces is set greater than that of the bearing surfaces 18, then the aforesaid problem can be avoided.

Figure 3:
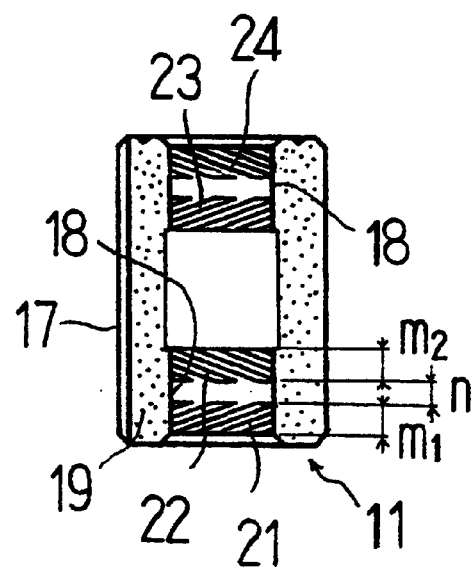
FIG. 3 is a sectional view of the sintered oil retaining bearing of the invention, wherein the bearing surfaces of the bearing body are formed with axially inclined hydrodynamic grooves.

An embodiment of the invention is shown in FIG. 3 wherein the bearing surfaces 18 of the bearing body 19 are formed with hydraulic grooves 21 and 22. The inner peripheral surface of the bearing body 19 is formed with two axially spaced bearing surfaces 18 and both of the two bearing surfaces 18 have a plurality of axially inclined hydrodynamic grooves 21 and 22 (herringbone type) circumferentially arranged thereon. All that is necessary is for the hydrodynamic grooves 21 and 22 to be formed such that they are inclined with respect to the axis, and so far as this condition is met, they may be of, for example, a spiral type, besides the herringbone type. The depth of the hydrodynamic grooves 21 and 22, which is suitably 2–6 $\mu$m, is set, for example, to 3 $\mu$m.

The two bearing surfaces 18 each have a first groove region $m_1$ in which hydrodynamic grooves 21 inclined in one direction are arranged, a second groove region $m_2$ that is axially spaced from the first groove region $m_1$ and in which hydrodynamic grooves 22 inclined in the other direction are arranged, and an annular smooth region n positioned between the two groove regions $m_1$ and $m_2$; the hydrodynamic grooves 21, 22 in the two groove regions $m_1$ and $m_2$ are separated by the smooth region n and discontinuous.

The back portions 23 and 24 between the smooth region n and the hydrodynamic grooves are at the same level. The aforesaid discontinuous hydrodynamic grooves 21 and 22 separated by the smooth region n are advantageous, as compared with an arrangement having V-shaped continuous type hydrodynamic grooves that are made continuous between the two groove regions by omitting the smooth region n, in that since the lubricating agent is collected around the smooth region n, the oil film pressure is high and in that because of the smooth region n having no groove, the bearing rigidity is high.

Providing the hydrodynamic grooves 21 and 22 in the bearing surfaces 18 in this manner results in the lubricating agent in and around the bearing clearances being drawn into the bearing clearances by the action of the hydrodynamic grooves 21 and 22, and the lubricating agent thus drawn into the bearing clearances forms oil films to support the rotary shaft 1 in a contactless manner. Therefore, providing the aforesaid inclined hydrodynamic grooves 21 and 22 in the bearing surfaces 18 results in the lubricating agent being continuously forced into the bearing surfaces 18 by the hydrodynamic action thereof, thereby increasing the oil film strength and improving the rigidity of the sintered oil retaining bearing 11.

When an oil film pressure develops in the bearing clearances, the presence of the surface openings in the bearing surfaces 18 allows the lubricating agent to flow back into the bearing body 19; however, if grossly large openings are removed and the surface opening percentage is maintained at 10% or less, as in the present invention, fresh supplies of lubricating agent are kept on being successively forced into the bearing clearances, so that the oil film strength and rigidity are maintained at high values. In this case, since continuous and stabilized oil films are formed, an unstable vibration (whirl) as found in a cylindrical bearing does not occur, so that a high degree of running accuracy is obtained while shaft deflection, NRRO, jitter, and the like are reduced. Further, since the rotary shaft 1 and the bearing body 19 rotate in a contactless manner, noise is low, and moreover the hydrodynamic type sintered oil retaining bearing 11 can be provided at low cost.

Figure 4:
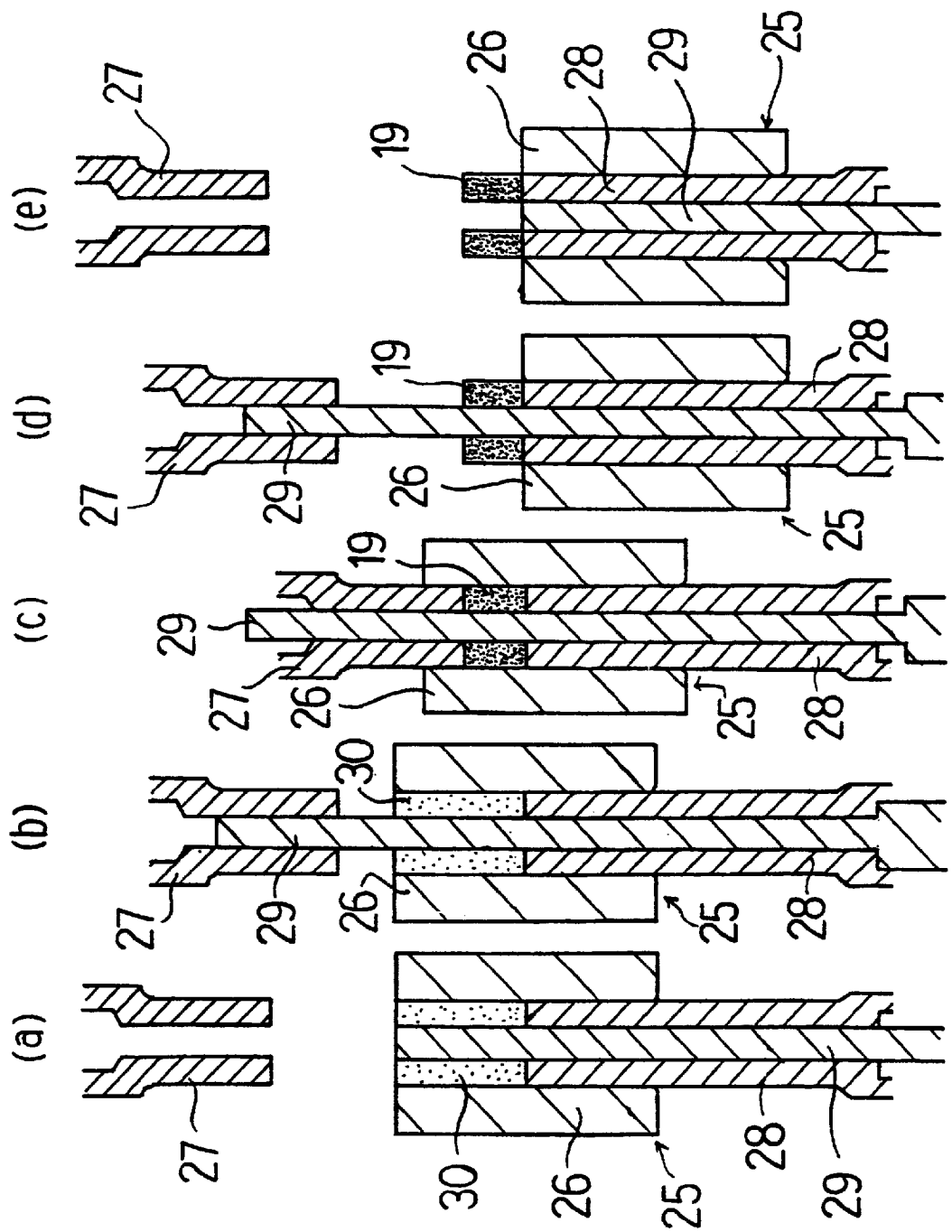
FIG. 4(*a*)–(*e*) show an embodiment of the method of the invention, being sectional views of a sintered oil retaining bearing showing the process of producing the bearing body.

As for a production method that excludes grossly large openings whose area corresponds to the diameter of a circle exceeding 0.05 mm when the area of one surface opening in the bearing surfaces 18 is converted into the area of such circle, the following method may be employed. In addition, a forming die assembly 25 for producing the bearing body 19 comprises, as shown in FIG. 4, a die 26 for forming the outer diameter of the bearing body 19, an upper punch 27 and a lower punch 28 for forming the width of the bearing body 19, and a core rod 29 for forming the inner diameter of the bearing body 19.

The present method imparts a relative motion between the core rod 29 and a metal powder 30 after the metal powder, which is a raw material for the bearing body 19, has been charged into the forming die assembly 25.

To exclude said grossly large openings, all that is necessary is to exclude the bridge phenomenon in which voids form as the flow of the metal powder 30 is impeded by friction with the surface of the core rod 29 when the metal powder 30 is charged into the forming die assembly 25. Thus, imparting a relative motion between the core rod 29 and the metal powder 30 causes the metal powder 30 held stagnant by friction with the surface of the core rod 29 to fall.

Particularly, in the state in which as shown in FIG. 4(a), the core rod 29 is inserted into the lower punch 28 until it reaches the cavity of the die 26, the metal powder 30 is charged into the cavity of the die 26.

After the charging of the metal powder 30, as shown in FIG. 4(b), the core rod 29 is raised to insert its upper end into the upper punch 27. This upward movement of the core rod 29 causes the metal powder 30 held stagnant in the die 26 by friction with the surface of the core rod 29 to fall, thereby preventing the bridge phenomenon.

As shown in FIG. 4(c), the upper punch 27 guided by the insertion of the core rod 29 is pressed downward into the die 26, whereby the metal powder 30 is compacted to form the bearing body 19. Thereafter, as shown in FIG. 4(d), the upper punch 27 is raised while the die 26 is lowered to the lower punch 28. Further, as shown in FIG. 4(e), the core rod 29 is lowered to the lower punch 28 and die 26, thereby making it possible to withdraw the bearing body 19 resulting from the compaction of the metal powder 30.

As for a method of imparting a relative motion between the metal powder 30 and the core rod 29 after the charging of the metal powder 30, besides the one described above, there is another, not shown, that comprises the steps of placing the core rod 29 before the charging of metal powder 30 so that its upper end is flush with the upper end of the lower punch 28, and then charging the metal powder 30 into the cavity of the die 26. After the charging of the metal powder 30, the core rod 29 is raised in the metal powder 30 held in the die 26, whereby a relative motion can be imparted between the core rod 29 and the metal powder 30.

Another method may be used that comprises the steps of charging the metal powder 30 into the cavity of the die 26, and vibrating the metal powder 30 with the core rod 29 inserted therein, thereby imparting a relative motion between the core rod 29 and the metal powder 30.

An embodiment of the invention will now be described. A sintered oil retaining bearing in this embodiment is produced normally by a process comprising the steps of mixing metal powders, forming, sintering, and re-compacting (sizing).

When it is desired to control the surface opening percentage of the bearing surfaces 18, this can be achieved by adding a rotary sizing step to the aforesaid steps, for finishing the bearing surfaces 18 while rotating a sizing core rod. By this step it is possible to control the surface opening percentage of the bearing surfaces 18 so that it is 10% or less. However, the use of the rotary sizing alone cannot exclude grossly large openings.

Further, in the case of forming hydrodynamic grooves 21 and 22, the rotary sizing is followed by a hydrodynamic groove-sizing step using a hydrodynamic groove-sizing core rod having a pattern for the hydrodynamic grooves 21 and 22 to be transferred.

To see the effects of excluding grossly large openings in the bearing surfaces 18, the following test pieces were produced to conduct evaluation tests. In addition, in the tables, TP means a test piece.

| | |
|---|---|
| TP 1 (inventive article) | After charging a metal powder during forming, the forming core rod is moved to exclude grossly large openings. |
| TP 2 (inventive article) | In addition to the operation of the test piece 1, rotary sizing was performed to provide a surface opening percentage of 10% or less for the bearing surface. |
| TP 3 (inventive article) | In addition to the operation of the test piece 2, hydrodynamic groove sizing was performed to form hydrodynamic grooves in the bearing surfaces. |
| TP 4 (prior article) | With the forming core rod fixed, a metal powder was charged, (having grossly large openings). |
| TP 5 (prior article) | In addition to operation of the test piece 4, rotary sizing was performed. |
| TP 6 (prior article) | In addition to the operation of the test piece 5, hydrodynamic groove sizing was performed to form hydrodynamic grooves in the bearing surfaces. |

Evaluations were made by observing the external appearance of the bearing surfaces 18, measuring the surface opening percentage, and measuring the shaft deflection using a DVD-ROM actual-motor shown in FIG. 1. In addition, to conduct the shaft deflection evaluation test, the rotary shaft 1 shown in FIG. 1 was replaced by one long enough to project beyond the clamper 5. The measurement of shaft deflection was made using a noncontact displacement meter. The table below shows the results of observation of the bearing surfaces and the surface opening percentage.

| Test Piece | Results of Observation of External Appearance (grossly Large Openings) | Surface Opening Percentage |
|---|---|---|
| TP 1 (inventive article) | No grossly large openings | 15–20% |
| TP 2 (inventive article) | No grossly large openings | 8–10% |
| TP 3 (inventive article) | No grossly large openings | 6–8% |
| TP 4 (prior article) | In circle conversion, some were openings 0.05 mm and more in diameter, including a small number of those having 0.1 mm and more. | 20–30% |
| TP 5 (prior article) | Some were 0.05 mm and more, including those which, though less in number than in the test piece 4, were 0.1 mm and more. | 10–20% |
| TP 6 (prior article) | Some were 0.05 mm and more, including those which, though less in number than in the test piece 4, were 0.1 mm and more. | 10–20% |

Note: The surface opening percentage was measured at three spots for each test piece and the value indicated in the table is in the range of distribution for five test pieces.

The present inventive articles have a substantially uniform distribution of the size of openings without having grossly large openings, so that the distribution range of surface opening percentage is narrow and a variation between test pieces is small. In addition, the reason why the surface opening percentage of the test piece 3 having hydrodynamic grooves is smaller than in the test piece 2 having no hydrodynamic grooves is that the finishing treatment was performed using a greater interference than in ordinary articles so as to provide hydrodynamic grooves.

In contrast thereto, since the prior art articles have grossly large openings, the range of distribution of surface opening percentage is wide and a variation between test pieces is great. Further, even if rotary sizing is applied, grossly large openings remain, so that the range of distribution of surface opening percentage does not narrow and it is difficult to control. Therefore, a stabilized performance or running accuracy can hardly be attained. Test conditions for shaft deflection and the results of measurements are shown in the table below.

| Test conditions | |
| --- | --- |
| RPM | ; 8,000 |
| Imbalance load | ; 1g · cm |
| Atmosphere | ; ordinary temperature and ordinary humidity |
| Measurement position | ; Outer surface of shaft 10 mm above disk surface |

| Test Piece | Shaft deflection ($\mu$m) |
| --- | --- |
| TP 1 (inventive article) | 30–40 |
| TP 2 (inventive article) | 20–30 |
| TP 3 (inventive article) | 8–10 |
| TP 4 (prior article) | 50 and more, immeasurable |
| TP 5 (prior article) | 40–50 |
| TP 6 (prior article) | 10–20 |

Note: The range of distribution of the results of measurement of n = 5 pieces is shown.

The rotary shaft 1 is supported by the oil film pressure in the bearing clearances that attends rotation; if, however, grossly large holes are present, the pressure is locally reduced and the running accuracy does not stabilize. In the prior art article TP 4 having grossly large openings, the limit of measurement was transgressed and even if rotary sizing was applied, the effect obtained was low and the shaft deflection was considerably large. When hydrodynamic grooves were formed, the hydrodynamic effect enhanced the ability to form oil films and the shaft deflection, though reduced, was larger than in the TP 3 excluding grossly large opening and having hydrodynamic grooves, and the variation was also large.

In contrast thereto, in the present inventive articles, simply excluding grossly large openings, (TP 1), produced smaller shaft deflection than in the prior article (TP 4), and the rotary sizing and hydrodynamic grooves provided remarkable effects.

What is claimed is:

1. A sintered oil retaining bearing having a bearing body that is composed of a porous body formed of a sintered metal and that is formed with a bearing surface opposed, through a bearing clearance, to an outer peripheral surface of a shaft to be supported, said bearing body being impregnated with lubricating oil or lubricating grease, said sintered oil retaining bearing being characterized in that surface openings formed in said bearing surface are substantially uniform in size, and if an area of a single surface opening is converted into an area of a circle, a diameter of such circle does not exceed 0.05 mm.

2. A sintered oil retaining bearing as set forth in claim 1, characterized in that the proportion of the surface area occupied by the surface openings to the total bearing surface is 10% or less.

3. A sintered oil retaining bearing as set forth in claim 1 or 2, characterized in that the shaft opposed to said bearing surface through the bearing clearance is a rotary shaft on which a rotary element of information equipment is mounted and that is driven for rotation by the exciting force that develops between a stator and a rotor.

4. A sintered oil retaining bearing as set forth in claim 1 or 2, characterized in that said bearing surface is formed with axially inclined hydrodynamic grooves.

5. A sintered oil retaining bearing as set forth in claim 4, characterized in that the shaft opposed to said bearing surface through the bearing clearance is a rotary shaft on which a rotary element of information equipment is mounted and that is driven for rotation by the exciting force that develops between a stator and a rotor.

6. A sintered oil retaining bearing as set forth in claim 1 or 2, characterized in that a plurality of bearing surfaces are located in axially spaced places, and an inner diameter of a region between bearing surfaces is greater than the inner diameter of the bearing surfaces.

7. A sintered oil retaining bearing as set forth in claim 6, characterized in that said bearing surfaces are formed with axially inclined hydrodynamic grooves.

8. sintered oil retaining bearing as set forth in claim 6, characterized in that the shaft opposed to said bearing surfaces through the bearing clearances is a rotary shaft on which a rotary element of information equipment is mounted and that is driven for rotation by the exciting force that develops between a stator and a rotor.

9. A spindle motor for information equipment including a rotary shaft on which a rotary element of information equipment is mounted, a bearing rotatably supporting said rotary shaft, a rotor mounted on said rotary shaft or a rotary member rotating with said rotary shaft, and a stator mounted on a stationary member, said spindle motor being characterized in that said bearing is a sintered oil retaining bearing having a bearing body that is composed of a porous body formed of a sintered metal and that is formed with a bearing surface opposed to the outer peripheral surface of the rotary shaft through a bearing clearance, said bearing body being impregnated with lubricating oil or lubricating grease, and surface openings formed in said bearing surface are substantially uniform in size and if an area of a single surface opening is converted into an area of a circle, a diameter of such circle does not exceed 0.5 mm.

* * * * *